(12) United States Patent
Sakamaki et al.

(10) Patent No.: US 9,021,702 B2
(45) Date of Patent: May 5, 2015

(54) TOOTHED PART MANUFACTURING METHOD, TOOTHED PART MANUFACTURING DEVICE, AND TOOTHED PART

(75) Inventors: Hiromu Sakamaki, Tahara (JP); Ariyoshi Terao, Anjo (JP); Toshifumi Nagata, Tahara (JP)

(73) Assignee: Aisin AW Co., Ltd., Anjo (JP)

( * ) Notice: Subject to any disclaimer, the term of this patent is extended or adjusted under 35 U.S.C. 154(b) by 402 days.

(21) Appl. No.: 13/365,831

(22) Filed: Feb. 3, 2012

(65) Prior Publication Data

US 2012/0216644 A1 Aug. 30, 2012

(30) Foreign Application Priority Data

Feb. 24, 2011 (JP) ................................. 2011-038975

(51) Int. Cl.
  *B21K 1/30* (2006.01)
  *B23P 15/14* (2006.01)
  *F16H 55/17* (2006.01)

(52) U.S. Cl.
  CPC .. *B21K 1/30* (2013.01); *F16H 55/17* (2013.01)

(58) Field of Classification Search
  CPC .......... B21D 53/28; B21K 1/30; B23P 15/14; F16H 55/17
  USPC ................. 29/893.34, 893.33; 72/352, 353.2, 72/353.6, 354.2, 434, 469
  See application file for complete search history.

(56) References Cited

U.S. PATENT DOCUMENTS

| | | | | | |
|---|---|---|---|---|---|
| 3,069,756 | A | * | 12/1962 | Colestock .................. | 29/893.36 |
| 3,298,219 | A | * | 1/1967 | Schober .......................... | 72/377 |
| 6,732,605 | B2 | * | 5/2004 | Takano et al. ................ | 74/459.5 |
| 7,827,692 | B2 | * | 11/2010 | Geiman ........................ | 29/893.3 |
| 2006/0236541 | A1 | * | 10/2006 | Prucher ....................... | 29/893.34 |
| 2007/0125148 | A1 | * | 6/2007 | Dohmann et al. .............. | 72/352 |
| 2010/0294064 | A1 | * | 11/2010 | Seko ............................... | 74/434 |
| 2012/0216643 | A1 | * | 8/2012 | Sakamaki ....................... | 74/434 |

(Continued)

FOREIGN PATENT DOCUMENTS

| JP | A-57-177845 | 11/1982 |
|---|---|---|
| JP | A-60-018248 | 1/1985 |

(Continued)

OTHER PUBLICATIONS

May 1, 2012 International Search Report issued in International Patent Application No. PCT/JP2012/053133 (with translation).

(Continued)

*Primary Examiner* — Alexander P Taousakis
(74) *Attorney, Agent, or Firm* — Oliff PLC

(57) ABSTRACT

When forming a toothed portion on the outer section of a blank by contacting a tooth profile-forming portion of a forming die with a curved portion of the blank, the first projection of the blank is accommodated in a first depression, and a load is applied axially to a center section of the blank so a material of the blank flows radially outward. The material of the blank at the first projection flows in the axial direction to inside the first depression, and the material of the blank at an intermediate section between the center and the outer section flows in axially to inside a second depression to form a second projection. When the load is maximized, a space is provided between a toothed portion and the tooth profile-forming portion, between the first projection and the forming die, and between the second projection and the forming die.

9 Claims, 11 Drawing Sheets

(56) References Cited

U.S. PATENT DOCUMENTS

| | | |
|---|---|---|
| 2012/0240405 A1 | 9/2012 | Iwata et al. |
| 2013/0059166 A1* | 3/2013 | Nagata et al. ................ 428/600 |
| 2013/0318792 A1 | 12/2013 | Iwata et al. |

FOREIGN PATENT DOCUMENTS

| | | |
|---|---|---|
| JP | A-61-162236 | 7/1986 |
| JP | A-07-100578 | 4/1995 |
| JP | A-2000-140989 | 5/2000 |
| JP | A-2007-509761 | 4/2007 |
| JP | A-2008-036642 | 2/2008 |
| JP | A-2009-106953 | 5/2009 |

OTHER PUBLICATIONS

U.S. Appl. No. 13/365,725 in the name of Iliromu Sakamaki, filed Feb. 3, 2012.

May 1, 2012 International Search Report issued in PCT/JP2012/053129 (with English-language translation).

Aug. 15, 2014 Non-Final Rejection issued in U.S. Appl. No. 13/365,725.

\* cited by examiner

F I G . 1
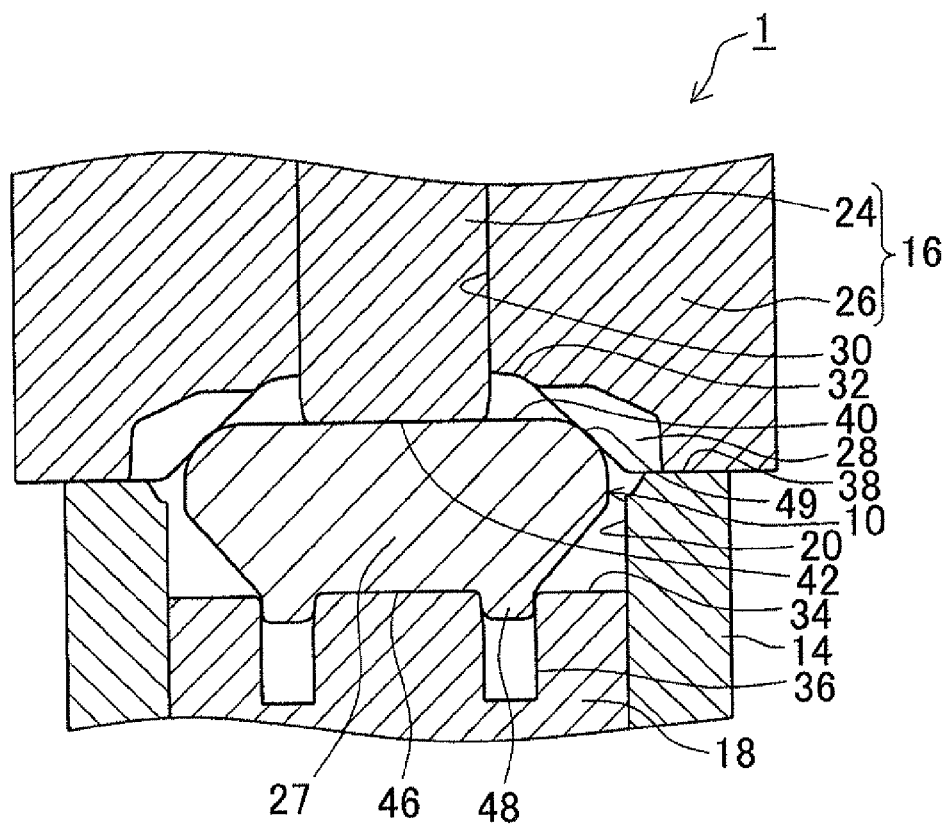

F I G . 10
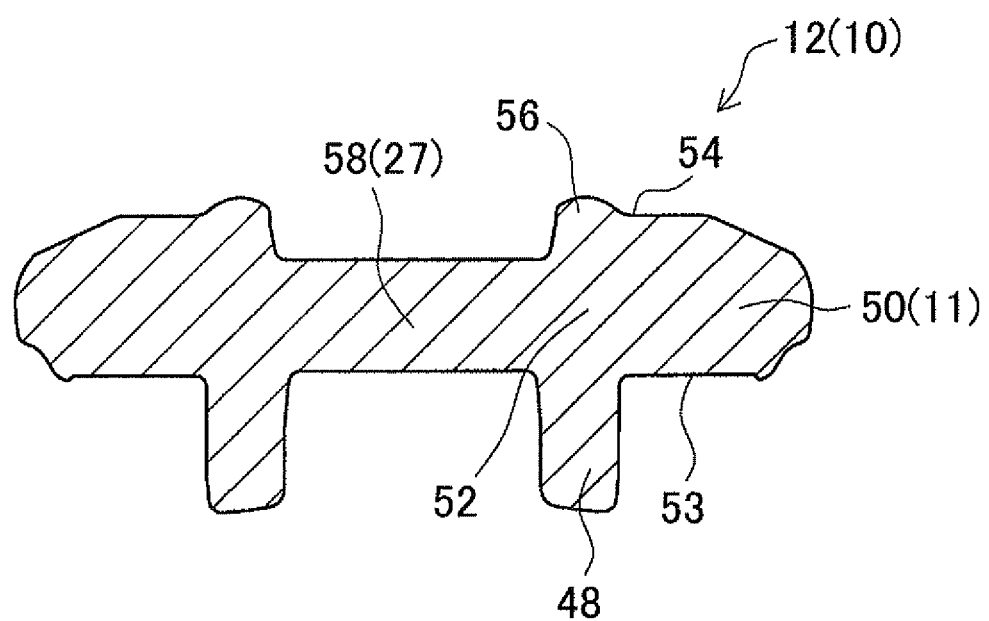

TOOTHED PART MANUFACTURING METHOD, TOOTHED PART MANUFACTURING DEVICE, AND TOOTHED PART

INCORPORATION BY REFERENCE

The disclosure of Japanese Patent Application No. 2011-038975 filed on Feb. 24, 2011 including the specification, drawings and abstract is incorporated herein by reference in its entirety.

BACKGROUND OF THE INVENTION

The present invention relates to a toothed part manufacturing method for manufacturing, by forging, a toothed part that includes a toothed portion such as bevel gear portion, and also relates to a toothed part manufacturing device, and a toothed part.

DESCRIPTION OF THE RELATED ART

Toothed parts that include a toothed portion have been manufactured in the past by forging a blank. In such forging, a toothed part whose outer peripheral surface includes a toothed portion is manufactured by compressing a cylindrical blank from the axial direction of the blank to force the constituent material of the blank radially outward from the blank, and fill the inside of a forming die with the constituent material of the blank.

By thus compressing the blank from the axial direction of the blank, first, the constituent material of the blank fills an inner section of the fanning die in the radial direction of the blank, after which the constituent material of the blank unidirectionally flows radially outward from the blank. Further compressing of the blank from the axial direction of the blank increases the surface pressure of a section of the forming die already filled with the constituent material of the blank, making it necessary to further increase the load (molding load) applied to the blank. The larger load applied to the forming die thus shortens the life of the forming die.

Japanese Patent Application Publication No. JP-A-57-177845 discloses art for forging. According to the art of JP-A-57-177845, a ring-shaped blank is subjected to pressure by a pressurizing mechanism from the axial direction while an outer circumferential surface of the ring-shaped blank is constrained, and the constituent material of the ring-shaped blank flows in the pressurizing direction to fill the inside of a tooth profile portion of a forming die. By using the pressurizing mechanism to apply pressure to the ring-shaped blank from the axial direction, some of the constituent material of the ring-shaped blank is pressed as excess material into an open space that is in communication with the tooth profile portion of the forming die. Thus, the constituent material of the ring-shaped blank flows under a constant pressure, which can reduce variations in product dimensions and precision that are caused by variations in the volume of the blank.

SUMMARY OF THE INVENTION

However, according to the art of JP-A-57-177845, after filling the inside of the tooth profile portion of the forming die with the constituent material of the ring-shaped blank, the ring-shaped blank is subjected to further pressure from the axial direction by the pressurizing mechanism, which increases the molding load. The larger load applied to the forming die thus shortens the life of the forming die.

The present invention was devised in order to solve the problem described above, and the present invention provides a toothed part manufacturing method, a toothed part manufacturing device, and a toothed part that can increase the life of a forming die.

An aspect of the present invention devised for solving the problem described above is a toothed part manufacturing method for manufacturing a toothed part from a rotationally symmetrical blank using a forming die. According to the toothed part manufacturing method, the blank includes on a radially outer section thereof a curved portion, and includes on one axial end surface thereof a first projection portion provided ring-like in the circumferential direction so as to protrude in the axial direction. In addition, the forming die includes a first depressed portion provided ring-like in the circumferential direction and depressed in the axial direction, and includes a second depressed portion provided ring-like in the circumferential direction so as to depress in the axial direction and provided axially opposite from the first depressed portion with the blank interposed between the first depressed portion and the second depressed portion. Furthermore, when forming a toothed portion on the outer section of the blank by contacting a tooth profile forming portion of the forming die with the curved portion of the blank, accommodating the first projection of the blank in the first depressed portion, and applying a load in the axial direction to a radially center section of the blank such that a constituent material of the blank flows radially outward, the constituent material of the blank at the first projection portion flows in the axial direction to inside the first depressed portion, and the constituent material of the blank at an intermediate section between the center section and the outer section flows in the axial direction to inside the second depressed portion to form a second projection portion. Moreover, when the load is at maximum, a space is provided between the toothed portion and the tooth profile forming portion, a space is provided between the first projection portion and the forming die, and a space is provided between the second projection portion and the forming die.

According to this aspect, the spaces are provided between the forming die and the blank so that the constituent material of the blank does not fully fill the forming die when the maximum molding load is applied in the axial direction of the blank to finish formation of the toothed portion. There is thus room left inside the spaces for the constituent material of the blank to flow. It is therefore possible to prevent the molding load from becoming excessively large as in enclosed die forging. Because the load on the forming die can be suppressed, the life of the forming die can be increased.

In addition, the constituent material of the blank flows in three directions, namely, a direction heading radially outward, a direction heading toward the first depressed portion of the forming die, and a direction heading toward the second depressed portion of the forming die. Therefore, a reduction effect on the molding load can be increased. Because the load on the forming die can be suppressed, the life of the forming die can be increased.

In the aspect described above, the second depressed portion may have an outer shape that becomes smaller in the axial direction.

According to this aspect, it is thus difficult for the constituent material of the blank to flow toward the second depressed portion of the tooth profile forming die. As a consequence, the blank does not fully fill the depressed portion of the forming die when formation of the toothed portion is finished, and the space between the blank and the forming die can be more easily provided. It is therefore possible to prevent the molding load from becoming excessively large regardless of the flowability of the constituent material of the blank. Moreover, because the load on the forming die can be suppressed regardless of the flowability of the constituent material of the blank, the life of the forming die can be increased.

In the aspect described above, the first depressed portion and the second depressed portion may be formed at positions symmetrical in the axial direction.

According to this aspect, during molding of the blank, both axial surfaces on a portion of the blank are not constrained. Therefore, the load applied to the blank can be further suppressed.

In the aspect described above, the toothed part may be a differential side gear of a differential device.

According to this aspect, due to the increased life of the forming die used for manufacturing the differential side gear, mass production of the differential side gear at a lower manufacturing cost can be achieved.

Another aspect of the present invention devised for solving the problem described above is a toothed part manufacturing device for manufacturing a toothed part from a rotationally symmetrical blank using a forming die. According to the toothed part manufacturing device, the blank includes on a radially outer section thereof a curved portion, and includes on one axial end surface thereof a first projection portion provided ring-like in the circumferential direction so as to protrude in the axial direction. In addition, the forming die includes a first depressed portion provided ring-like in the circumferential direction and depressed in the axial direction, and includes a second depressed portion provided ring-like in the circumferential direction so as to depress in the axial direction and provided axially opposite from the first depressed portion with the blank interposed between the first depressed portion and the second depressed portion. Furthermore, when forming a toothed portion on the outer section of the blank by contacting a tooth profile forming portion of the forming die with the curved portion of the blank, accommodating the first projection of the blank in the first depressed portion, and applying a load in the axial direction to a radially center section of the blank such that a constituent material of the blank flows radially outward, the constituent material of the blank at the first projection portion flows in the axial direction to inside the first depressed portion, and the constituent material of the blank at an intermediate section between the center section and the outer section flows in the axial direction to inside the second depressed portion to form a second projection portion. Moreover, when the load is at maximum, a space is provided between the toothed portion and the tooth profile forming portion, a space is provided between the first projection portion and the forming die, and a space is provided between the second projection portion and the forming die.

According to this aspect, the spaces are provided between the forming die and the blank so that the constituent material of the blank does not fully fill the forming die when the maximum molding load is applied in the axial direction of the blank to finish formation of the toothed portion. There is thus room left inside the spaces for the constituent material of the blank to flow. It is therefore possible to prevent the molding load from becoming excessively large as in enclosed die forging. Because the load on the forming die can be suppressed, the life of the forming die can be increased.

Another aspect of the present invention devised for solving the problem described above is a toothed part manufactured from a rotationally symmetrical blank using a forming die. According to the toothed part, the blank includes on a radially outer section thereof a curved portion, and includes on one axial end surface thereof a first projection portion provided ring-like in the circumferential direction so as to protrude in the axial direction; the forming die includes a first depressed portion provided ring-like in the circumferential direction and depressed in the axial direction, and includes a second depressed portion provided ring-like in the circumferential direction so as to depress in the axial direction and provided axially opposite from the first depressed portion with the blank interposed between the first depressed portion and the second depressed portion; when forming a toothed portion on the outer section of the blank by contacting a tooth profile forming portion of the forming die with the curved portion of the blank, accommodating the first projection of the blank in the first depressed portion, and applying a load in the axial direction to a radially center section of the blank such that a constituent material of the blank flows radially outward, the constituent material of the blank at the first projection portion flows in the axial direction to inside the first depressed portion, and the constituent material of the blank at an intermediate section between the center section and the outer section flows in the axial direction to inside the second depressed portion to form a second projection portion; and when the load is at maximum, a space is provided between the toothed portion and the tooth profile forming portion, a space is provided between the first projection portion and the forming die, and a space is provided between the second projection portion and the forming die, thereby manufacturing the toothed part. In addition, the first projection portion is provided on the one axial end surface. Furthermore, the second projection portion is provided on the other axial end surface. Moreover, the second projection portion is provided radially inward of the toothed portion.

According to this aspect, the spaces are provided between the forming die and the blank so that the constituent material of the blank does not fully fill the forming die when the maximum molding load is applied in the axial direction of the blank to finish formation of the toothed portion. There is thus room left inside the spaces for the constituent material of the blank to flow. It is therefore possible to prevent the molding load from becoming excessively large as in enclosed die forging. Because the load on the forming die can be suppressed, the life of the forming die can be increased.

In addition, because the second projection portion is provided radially inward with respect to the toothed portion (on an inner side of an inner-diameter end surface of the toothed portion), the second projection portion has no effect on the functionality of the toothed part when the toothed part meshes with another toothed part at the toothed portion.

According to the toothed part manufacturing method, the toothed part manufacturing device, and the toothed part of the present invention, the life of the forming die can be increased.

BRIEF DESCRIPTION OF THE DRAWINGS

FIG. 1 is a structural diagram of an essential portion of a toothed part manufacturing device before molding of a blank;

FIG. 10 is a cross-sectional view of a differential side gear; and

DETAILED DESCRIPTION OF THE EMBODIMENT

A specific embodiment of the present invention will be described in detail with reference to the accompanying drawings. In the present embodiment, a differential side gear used in a differential device of a vehicle is described as an example of a toothed part. Note that the differential side gear of the differential device is a gear that is rotatably supported by a drive shaft while meshed with a differential pinion gear inside a differential case.

Description of the Manufacturing Device

Figure 3:
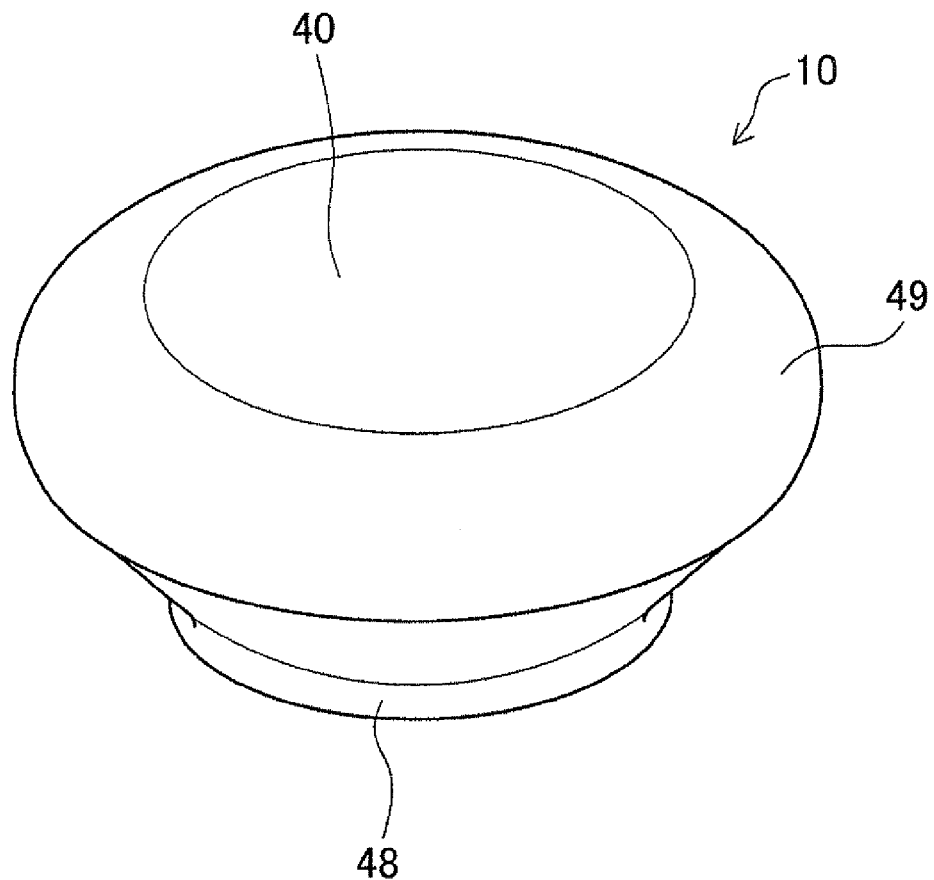
FIG. 3 is a perspective view of an outer appearance of the blank before molding.

First, a toothed part manufacturing device 1 will be described. The manufacturing device 1 manufactures a differential side gear 12 (see FIG. 11) that includes a bevel gear portion 11 from a rotationally symmetrical blank 10 (see FIG. 3) by forging.

As shown in FIG. 1, the manufacturing device 1 includes forming dies, namely, an outer forming die 14, a tooth profile forming die 16, and a recess-shaped die 18. The manufacturing device 1 also includes an actuator (not shown) such as a hydraulic cylinder for operating each of the forming dies, and a control device (not shown) that controls the operation of the actuator. Note that FIG. 1 is a structural diagram of an essential portion of the manufacturing device 1 before molding of the blank 10.

The outer forming die 14 is formed into a cylindrical shape and has an inner circumferential surface 20. The blank 10 is disposed and the recess-shaped die 18 is also provided inward of the inner circumferential surface 20. During molding of the blank 10, the outer forming die 14 moves in the downward direction (direction in which a compressing portion 24 applies a load to the blank 10) in sync with the tooth profile forming die 16.

The tooth profile forming die 16 includes the compressing portion 24 and a tooth profile forming portion 26. The cylindrical tooth profile forming portion 26 is provided on the outer side of the cylindrical compressing portion 24. The compressing portion 24 is provided at a position that corresponds to a center section 27 of the blank 10. The tooth profile forming portion 26 includes on a lower side thereof (side on which the outer forming die 14 and the recess-shaped die 18 are provided) a tooth profile portion 28 that is formed into the shape of a bevel gear.

Figure 2:
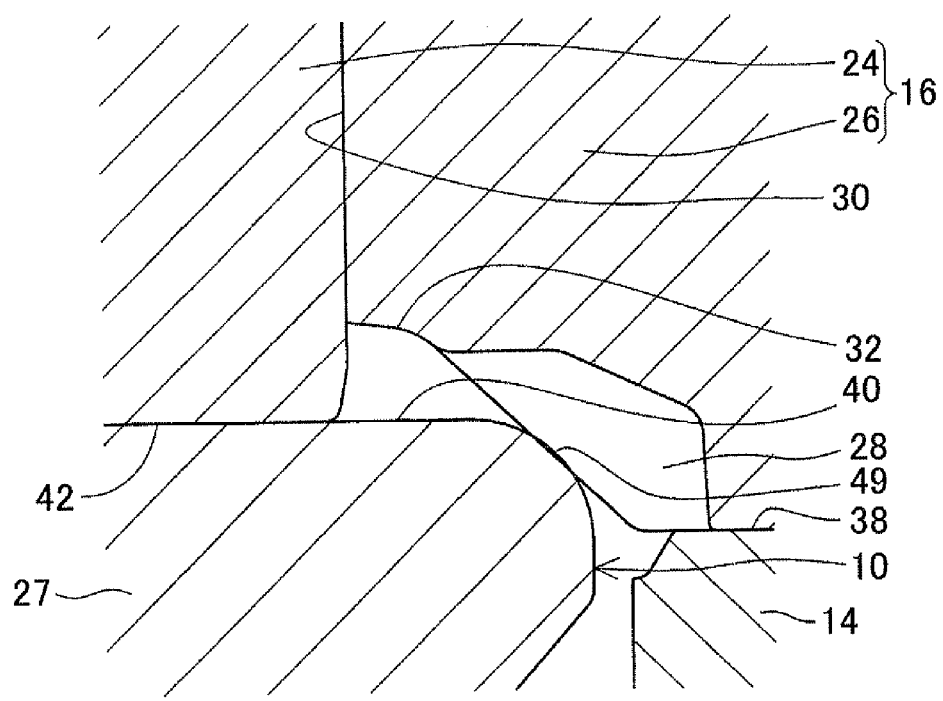
FIG. 2 is an enlarged view of a material clearance portion and a surrounding area in FIG. 1.

As shown in FIG. 2, the tooth profile forming portion 26 includes a material clearance portion 32 on the inner side of the tooth profile portion 28, that is, between the compressing portion 24 and the tooth profile portion 28 (between the tooth profile portion 28 and an inner circumferential surface 30 of the tooth profile forming portion 26). The material clearance portion 32 is provided so as to depress upward (in a direction opposite from the direction in which the compressing portion 24 applies a load to the blank 10). The material clearance portion 32 has an outer shape formed into a configuration that tapers upward. In addition, the material clearance portion 32 is provided ring-like in the circumferential direction of the tooth profile forming portion 26 along the inner circumferential surface 30 of the tooth profile forming portion 26. Note that FIG. 2 is an enlarged view of the material clearance portion 32 and a surrounding area in FIG. 1. The material clearance portion 32 is an example of a "second depressed portion" of the present invention.

The recess-shaped die 18 is formed into a cylindrical shape, and includes on an upper side thereof (side on which the tooth profile forming die 16 is provided) an end surface 34, and a recess portion 36 that is provided so as to depress downward from the end surface 34. The recess-shaped die 18 is provided inward of the inner circumferential surface 20 of the outer forming die 14. The recess portion 36 is provided ring-like in the circumferential direction of the recess-shaped die 18. In the radial direction (left-right direction in FIG. 1), the recess portion 36 is formed at the same position as the material clearance portion 32 of the tooth profile forming die 16. That is, the material clearance portion 32 and the recess portion 36 are provided on opposite sides in the axial direction (up-down direction in FIG. 1) with the blank 10 therebetween, and provided at positions symmetrical in the axial direction. The recess portion 36 is an example of a "first depressed portion" of the present invention.

Description of the Manufacturing Method

Next, a method for manufacturing the differential side gear 12 using the thus configured manufacturing device 1 will be described.

First, as shown in FIG. 1, with the end surface 34 of the recess-shaped die 18 positioned lower than an end surface 38 on the upper side (side on which the tooth profile forming die 16 is provided) of the outer forming die 14, the blank 10 is disposed on the end surface 34 of the recess-shaped die 18 inward of the inner circumferential surface 20 of the outer forming die 14. Next, the tooth profile forming die 16 is disposed by disposing the tooth profile forming portion 26 on the end surface 38 of the outer forming die 14, and disposing the compressing portion 24 on an upper end surface 40 (end surface on the side where the tooth profile foaming die 16 is provided) of the blank 10. Thus, the blank 10 is disposed inside a space enclosed by the forming dies, i.e., the outer forming die 14, the tooth profile forming die 16, and the recess-shaped die 18. At such time, the blank 10 is interposed between the end surface 34 of the recess-shaped die 18 and an end surface 42 of the compressing portion 24.

The blank 10 is formed into a rotationally symmetrical shape. The blank 10 includes a lower end surface 46 as one axial end surface, and the upper end surface 40 as the other axial end surface. The outer diameter of the lower end surface 46 is formed smaller than the outer diameter of the upper end surface 40, and the lower end surface 46 includes a convex-shaped boss portion 48 that is formed so as to protrude downward. The boss portion 48 is formed ring-like in the circumferential direction of the blank 10. The boss portion 48 is inserted inside the recess portion 36 of the recess-shaped die 18 to dispose the blank 10 on the end surface 34 of the recess-shaped die 18. Note that, by inserting the boss portion 48 inside the recess portion 36 of the recess-shaped die 18, the blank 10 can be positioned in the radial direction (left-right direction in FIG. 1) with respect to the forming dies. The boss portion 48 is an example of a "first projection portion" of the present invention.

The blank 10 also includes a curved portion 49 with a circular shape on an outer circumferential end portion of the upper end surface 40. The curved portion 49 is a section that contacts the tooth profile portion 28 of the tooth profile forming portion 26 as described later.

Figure 4:
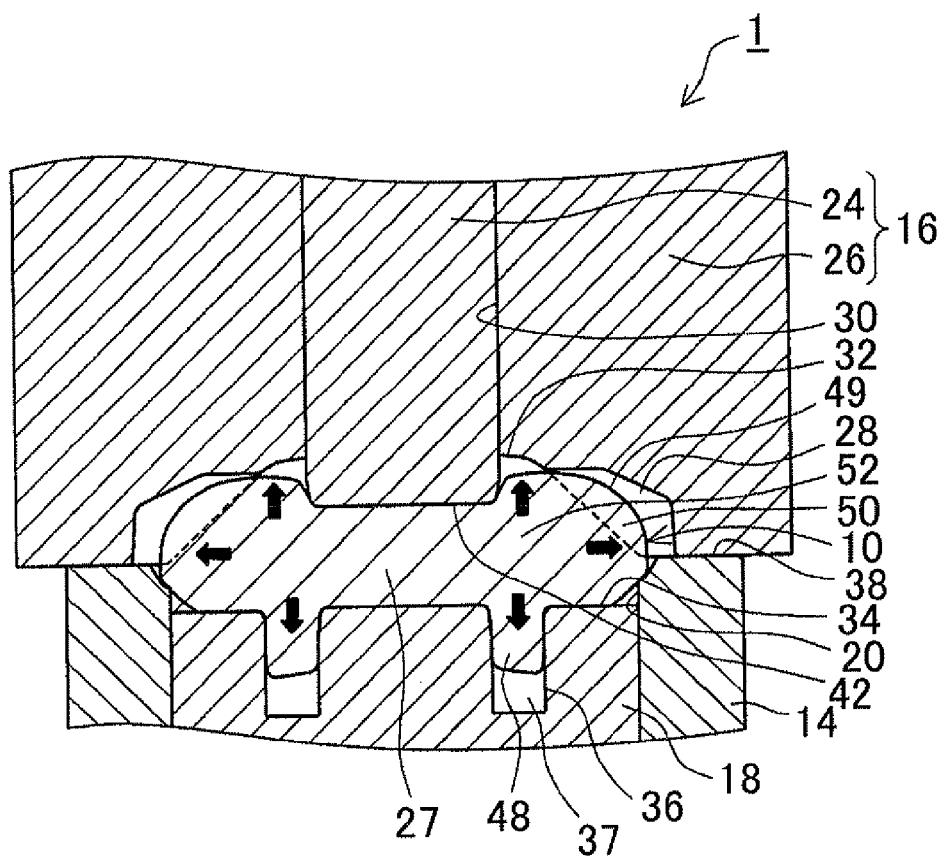
FIG. 4 is a structural diagram of the essential portion of the toothed part manufacturing device during molding of the blank.

Next, as shown in FIG. 4, the outer forming die 14 and the tooth profile forming die 16 move as one (in sync) downward relative to the recess-shaped die 18 (in the direction where the recess-shaped die 18 is provided). At such time, the compressing portion 24 of the tooth profile forming die 16 applies a downward load to the center section 27 of the blank 10 and compresses the center section 27, whereby the constituent material of the blank 10 flows outward in the radial direction of the blank 10 (left-right direction in FIG. 4). The tooth profile portion 28 of the tooth profile forming portion 26 then contacts the curved portion 49 of the blank 10, and the curved portion 49 is compressed by the tooth profile portion 28 of the tooth profile forming portion 26. Teeth are consequently formed on an outer section 50 of the blank 10, thus forming the bevel gear portion 11.

Figure 5:
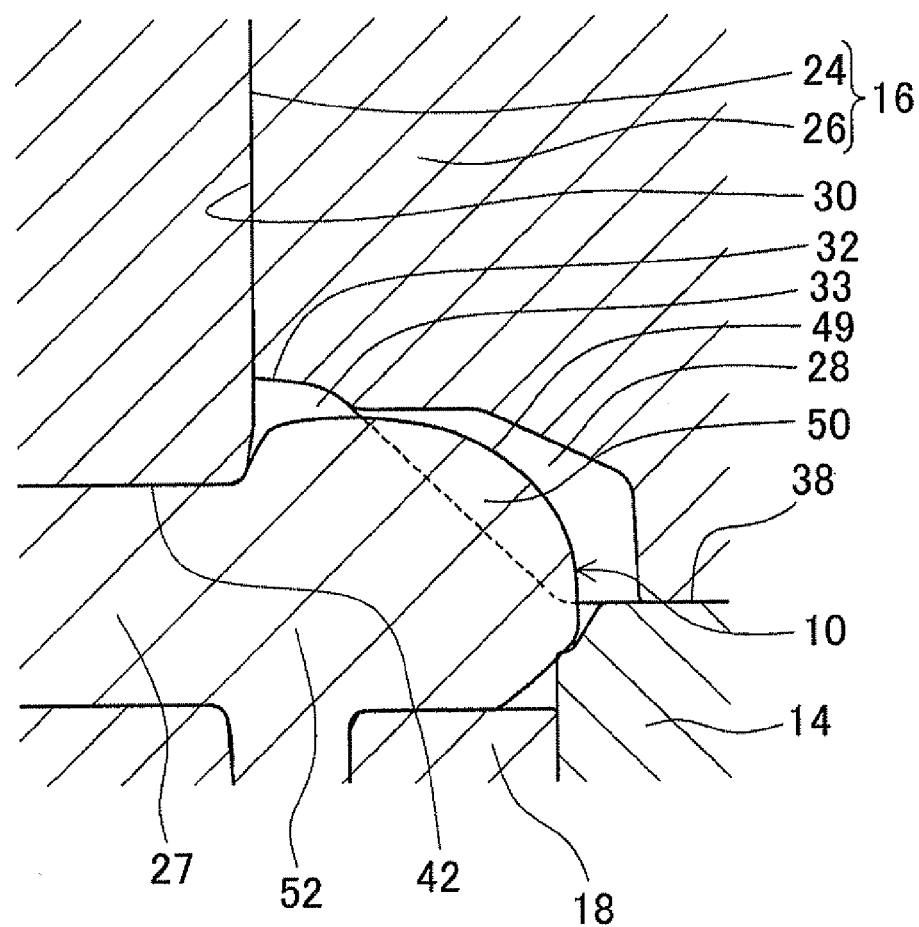
FIG. 5 is an enlarged view of the material clearance portion and the surrounding area in FIG. 4.
Figure 6:
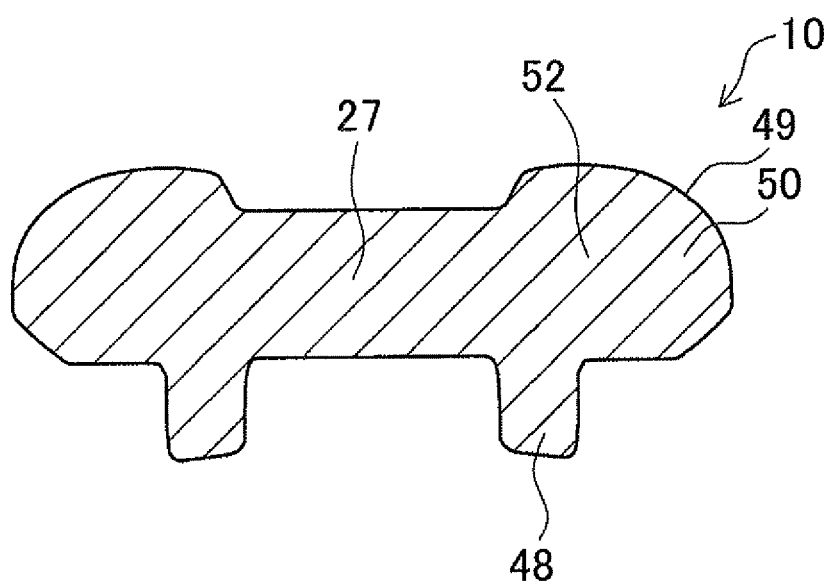
FIG. 6 is a cross-sectional view of the blank during molding.
Figure 7:
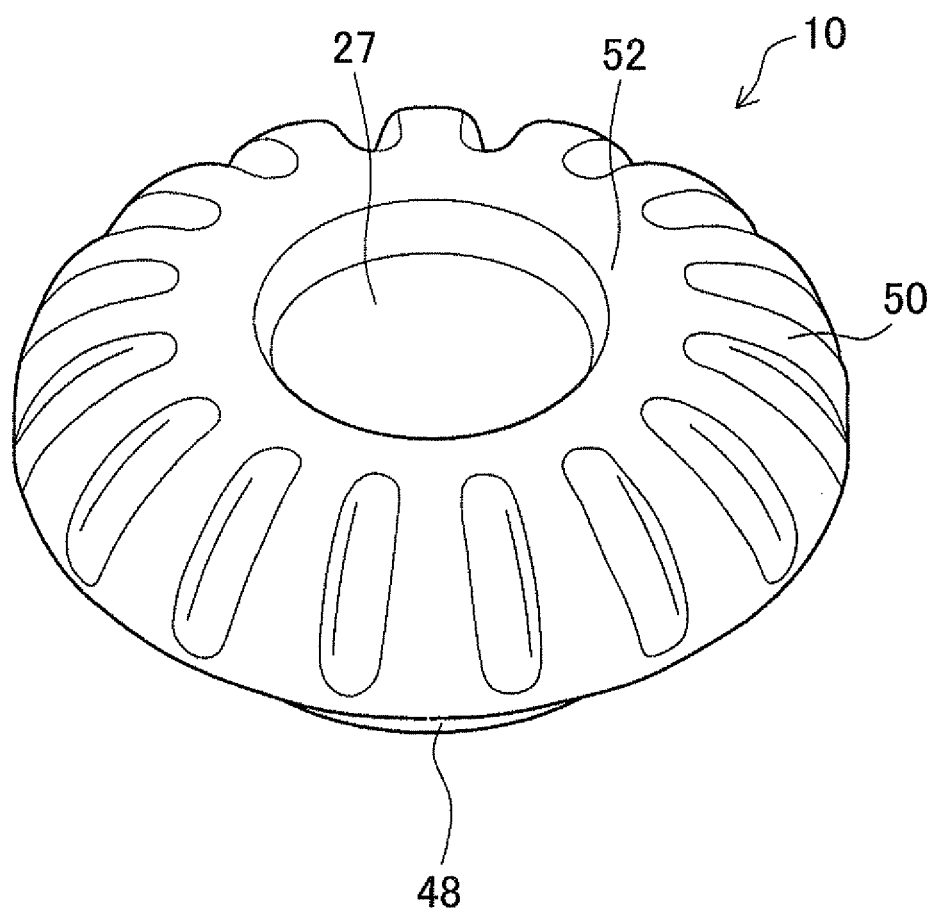
FIG. 7 is a perspective view of the outer appearance of the blank during molding.

At such time, the radially center section 27 of the blank 10 is compressed and reduced in thickness, and the constituent material of the blank 10 flows outward from the blank 10. Then, as shown in FIG. 5, the constituent material of an intermediate section 52 of the blank 10 between the center section 27 and the outer section 50 flows upward inside the material clearance portion 32, and a space 33 is left inside the material clearance portion 32 between the constituent material of the intermediate section 52 of the blank 10 and the tooth profile forming die 16. In this manner, the constituent material of the intermediate section 52 is not constrained and is free to move upward inside the material clearance portion 32. As shown in FIG. 4, the constituent material of the boss portion 48 of the blank 10 flows downward inside the recess portion 36, and a space 37 is left inside the recess portion 36 between the boss portion 48 and the recess-shaped die 18. In this manner, the constituent material of the boss portion 48 is not constrained and is free to move downward inside the recess portion 36. At such time, the blank 10 takes on a form as shown in FIGS. 6 and 7.

Note that FIG. 4 is a structural diagram of the essential portion of the manufacturing device 1 during molding of the blank 10, and FIG. 5 is an enlarged view of the material clearance portion 32 and the surrounding area in FIG. 4. FIG. 6 is a cross-sectional view of the blank 10 during molding, and FIG. 7 is a perspective view of the outer appearance of the blank 10 during molding.

In this manner, during molding of the blank 10, the intermediate section 52 of the blank 10 is free to move upward and downward (in the axial direction). There are thus few sections where the constituent material of the blank 10 is constrained by the forming dies. Accordingly, the blank 10 can be molded while suppressing the molding load applied by the tooth profile forming die 16 to the blank 10. It is thus possible to suppress the load on the forming dies, i.e., the outer forming die 14, the tooth profile forming die 16, and the recess-shaped die 18.

In addition, the constituent material of the blank 10 flows in three directions, namely, a direction heading radially outward, a direction heading inside the recess portion 36, and a direction heading inside the material clearance portion 32. Therefore, a reduction effect on the molding load can be achieved.

Figure 8:
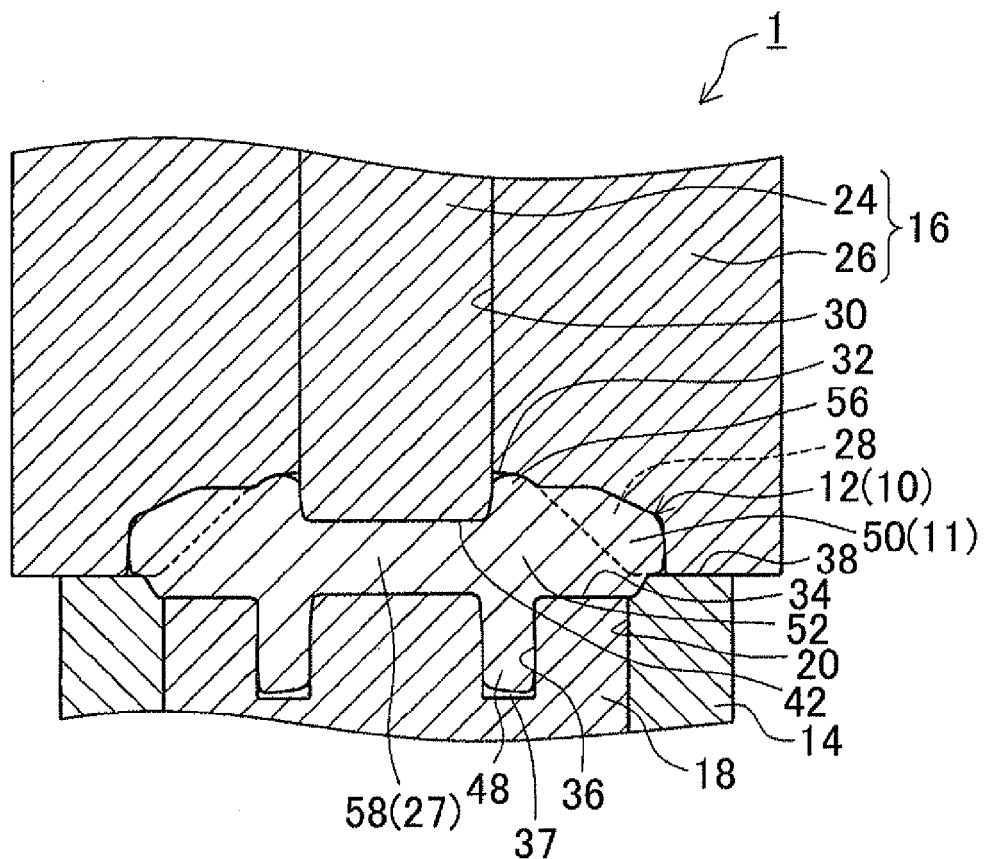
FIG. 8 is a structural diagram of the essential portion of the toothed part manufacturing device after molding of the blank is complete.
Figure 11:
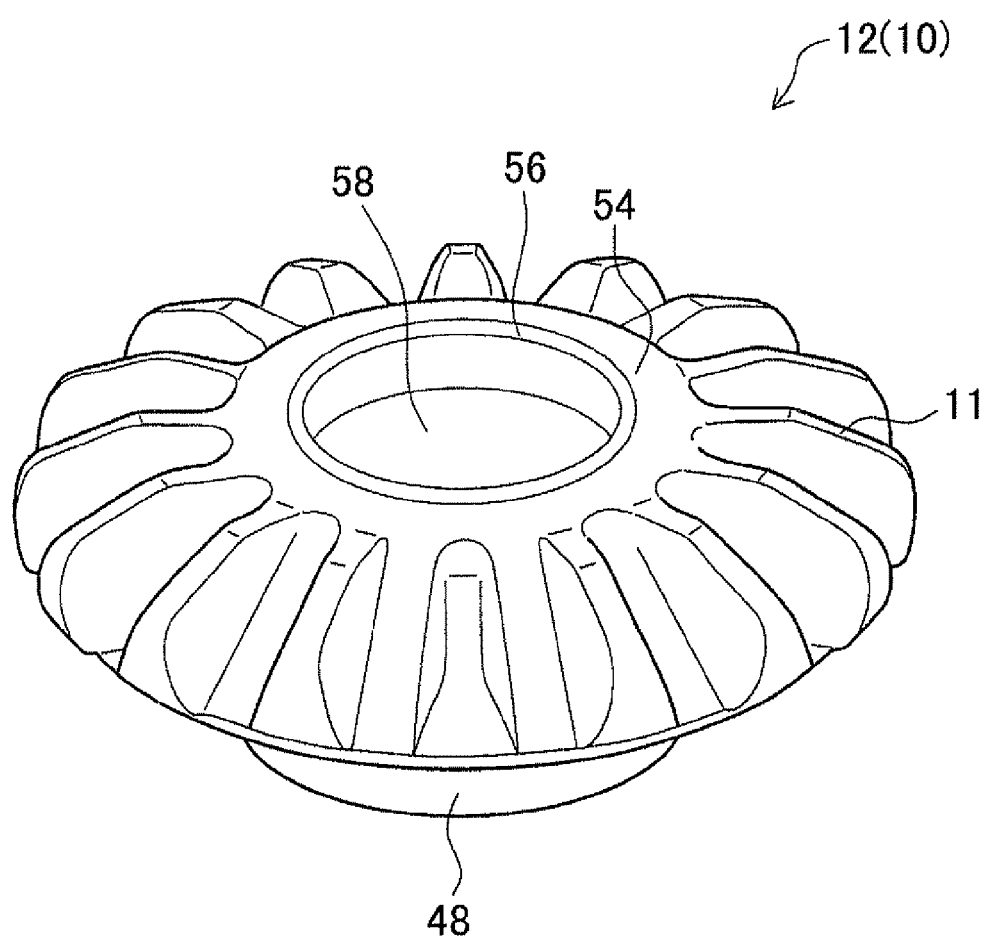
FIG. 11 is a perspective view of an outer appearance of the differential side gear.

Next, as shown in FIG. 8, when the outer forming die 14 and the tooth profile forming die 16 further move as one downward relative to the recess-shaped die 18, the blank 10 is further compressed by the tooth profile forming die 16. The constituent material of the blank 10 thus flows further in the radial direction (left-right direction in FIG. 8) outward from the blank 10. The constituent material of the blank 10 then flows into the tooth profile portion 28 of the tooth profile forming die 16 to form a bevel gear on the outer section 50 of the blank 10, thereby completing molding of the blank 10. As shown in FIGS. 10 and 11, it is thus possible to manufacture the differential side gear 12 that includes the bevel gear portion 11 and is formed into a rotationally symmetrical shape. Note that, to complete molding of the blank 10, the outer forming die 14 and the tooth profile forming die 16 are moved to the most downward position and the largest molding load is applied.

Figure 9:
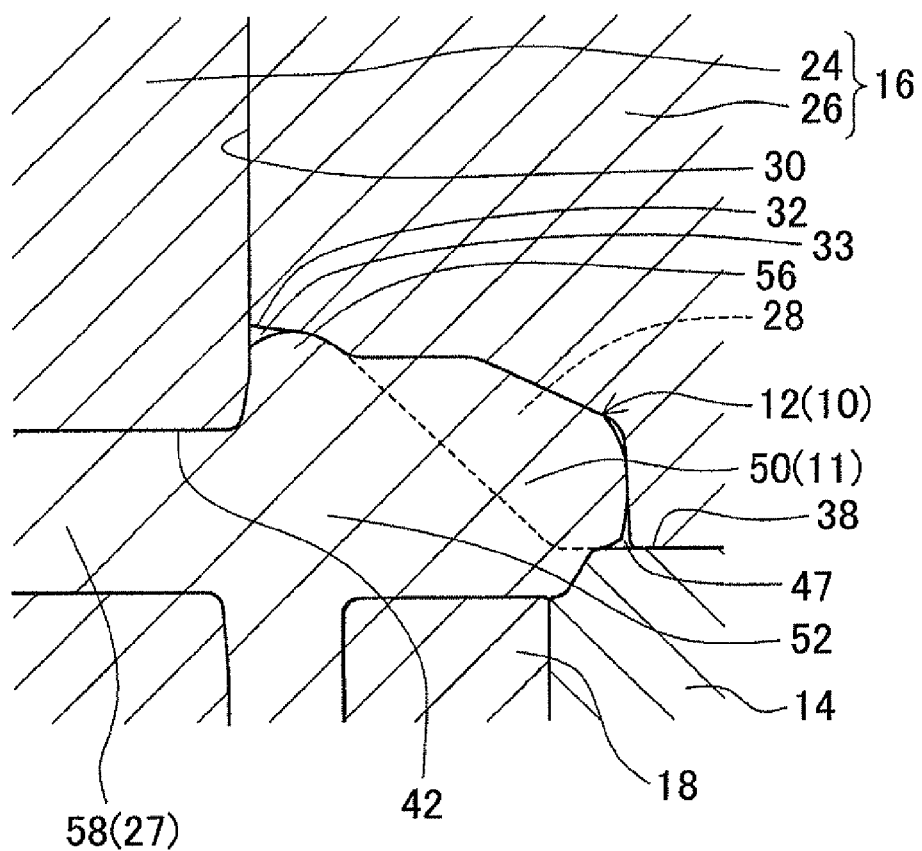
FIG. 9 is an enlarged view of the material clearance portion and the surrounding area in FIG. 8.

Here, when molding of the blank 10 is complete, as shown in FIGS. 8 and 9, the constituent material of the blank 10 flows inside the material clearance portion 32 of the tooth profile forming die 16 to form a projection portion 56 (an example of a "second projection portion" of the present invention), and the space 33 is provided between the projection portion 56 and the tooth profile forming die 16 inside the material clearance portion 32. Inside the recess portion 36 of the recess-shaped die 18, the space 37 is provided between the boss portion 48 and the recess-shaped die 18. Therefore, the constituent material of the blank 10 is not constrained inside the material clearance portion 32 of the tooth profile forming die 16 or inside the recess portion 36 of the recess-shaped die 18 until molding of the blank 10 is complete. Accordingly, the blank 10 can be molded while suppressing the molding load applied by the tooth profile forming die 16 to the blank 10 until molding of the blank 10 is completed and the differential gear 12 manufactured. Moreover, it is possible to suppress the load on the forming dies, i.e., the outer forming die 14, the tooth profile forming die 16, and the recess-shaped die 18.

Increasing the axial length (depth) of the recess portion 36 of the recess-shaped die 18 also increases the resistance to the flow of the constituent material of the blank 10, and makes it more difficult for the constituent material of the blank 10 to flow into the recess portion 36. Therefore, adjusting the axial length of the recess portion 36 of the recess-shaped die 18 also adjusts the resistance to the flow of the constituent material of the blank 10, and makes it possible to reliably provide the space 37 between the boss portion 48 and the recess-shaped die 18 when molding of the blank 10 is complete.

In addition, when molding of the blank 10 is complete, a space 47 (see FIG. 9) is provided between the bevel gear portion 11 and the tooth profile forming die 16. Thus, during molding of the blank 10, the molding load applied by the tooth profile forming die 16 to the blank 10 can be further suppressed, and the load applied to the forming dies, i.e., the outer forming die 14, the tooth profile forming die 16, and the recess-shaped die 18, can be further suppressed.

When molding of the blank 10 is complete, the differential side gear 12 (blank 10) as shown in FIGS. 10 and 11 includes the cylindrical boss portion 48 that is formed so as to protrude downward (in the direction in which the compressing portion 24 applies a load to the blank 10) from an end surface 53 (radially formed surface) that faces downward in the central axial direction. The differential side gear 12 (blank 10) also includes the projection portion 56 that is formed so as to protrude upward (in a direction opposite from the direction in which the compressing portion 24 applies a load to the blank 10) from an inner end surface 54 on an inner side of the bevel gear portion 11 on an end surface (radially formed surface) that faces upward in the central axial direction. It should be noted that the projection portion 56 is formed on a section that does not interfere with a mating part (the differential pinion gear) that meshes with the differential side gear 12. Therefore, the projection portion 56 has no effect on the functionality of the differential side gear 12 used in the differential device.

Note that FIG. 8 is a structural diagram of the essential portion of the manufacturing device 1 after molding of the blank 10 is complete, and FIG. 9 is an enlarged view of the material clearance portion 32 and the surrounding area in FIG. 8. FIG. 10 is a cross-sectional view of the differential side gear 12, and FIG. 11 is a perspective view of an outer appearance of the differential side gear 12.

Also note that a center section 58 (see FIGS. 10 and 11) of the differential side gear 12 manufactured as described above undergoes additional processing such as boring in the central axial direction (up-down direction in FIG. 10) to form an axial hole therein for accommodating the drive shaft (not shown).

Description of Effects of the Embodiment

According to the present embodiment, the spaces 33, 37, 47 are provided between the forming dies and the blank 10 (differential side gear 12) so that the constituent material of the blank 10 does not fully fill the forming dies when the maximum molding load is applied in the axial direction of the blank 10 to finish formation of the bevel gear portion 11. There is thus room left inside the spaces 33, 37, 47 for the constituent material of the blank 10 to flow. It is therefore possible to prevent the molding load from becoming excessively large as in enclosed die forging. Accordingly, because the load on the forming dies, i.e., the outer forming die 14, the tooth profile forming die 16, and the recess-shaped die 18, can be suppressed, the life of the forming dies can be increased. An example of the results from a test evaluation showed that the molding load was reduced 10% to 20%.

In addition, the constituent material of the blank 10 flows in three directions, namely, a direction heading radially outward, a direction heading toward the recess portion 36, and a direction heading toward the material clearance portion 32. Therefore, a reduction effect on the molding load can be increased.

The outer shape of the material clearance portion 32 becomes smaller in the upward direction. This makes it difficult for the constituent material of the blank 10 to flow toward the material clearance portion 32. As a consequence, the constituent material of the blank 10 does not fully fill the material clearance portion 32 when formation of the bevel gear portion 11 is finished, and the space 33 between the projection portion 56 and the tooth profile forming die 16 can be more easily provided. It is therefore possible to prevent the molding load from becoming excessively large regardless of the flowability of the constituent material of the blank 10. Moreover, because the load on the forming dies can be suppressed regardless of the flowability of the constituent material of the blank 10, the life of the forming dies can be increased.

The material clearance portion 32 and the recess portion 36 are formed at positions symmetrical in the axial direction. Therefore, during molding of the blank 10, both axial surfaces of the intermediate section 52 of the blank 10 are not constrained. Therefore, the load applied to the blank 10 can be further suppressed.

Due to the increased life of the forming dies used for manufacturing the differential side gear 12, mass production of the differential side gear 12 at a lower manufacturing cost can be achieved.

Note that the embodiment described above is only meant to illustrate an example and does not limit the present invention in any manner; various improvements and modifications are obviously possible without departing from the scope of the invention.

What is claimed is:

1. A toothed part manufacturing method for manufacturing a toothed part from a rotationally symmetrical blank using a forming die, wherein the blank includes on a radially outer section thereof a curved portion, and includes on one axial end surface thereof a first projection portion provided ring-like in the circumferential direction so as to protrude in the axial direction, the forming die includes a first depressed portion provided ring-like in the circumferential direction and depressed in the axial direction, and includes a second depressed portion provided ring-like in the circumferential direction so as to depress in the axial direction and provided axially opposite from the first depressed portion with the blank interposed between the first depressed portion and the second depressed portion, when forming a toothed portion on the outer section of the blank by contacting a tooth profile forming portion of the forming die with the curved portion of the blank, accommodating the first projection of the blank in the first depressed portion, and applying a load in the axial direction to a radially center section of the blank such that a constituent material of the blank flows radially outward, the constituent material of the blank at the first projection portion flows in the axial direction to inside the first depressed portion, and the constituent material of the blank at an intermediate section between the center section and the outer section flows in the axial direction to inside the second depressed portion to form a second projection portion, and when the load is at maximum, a space is provided between the toothed portion and the tooth profile forming portion, a space is provided between the first projection portion and the forming die, and a space is provided between the second projection portion and the forming die.

2. The toothed part manufacturing method according to claim 1, wherein the second depressed portion has an outer shape that becomes smaller in the axial direction.

3. The toothed part manufacturing method according to claim 1, wherein the first depressed portion and the second depressed portion are formed at positions symmetrical in the axial direction.

4. The toothed part manufacturing method according to claim 2, wherein the first depressed portion and the second depressed portion are formed at positions symmetrical in the axial direction.

5. The toothed part manufacturing method according to claim 1, wherein the toothed part is a differential side gear of a differential device.

6. The toothed part manufacturing method according to claim 2, wherein the toothed part is a differential side gear of a differential device.

7. The toothed part manufacturing method according to claim 3, wherein the toothed part is a differential side gear of a differential device.

8. The toothed part manufacturing method according to claim 4, wherein the toothed part is a differential side gear of a differential device.

9. A toothed part manufacturing device for manufacturing a toothed part from a rotationally symmetrical blank using a forming die, wherein the blank includes on a radially outer section thereof a curved portion, and includes on one axial end surface thereof a first projection portion provided ring-like in the circumferential direction so as to protrude in the axial direction, the forming die includes a first depressed portion provided ring-like in the circumferential direction and depressed in the axial direction, and includes a second depressed portion provided ring-like in the circumferential direction so as to depress in the axial direction and provided axially opposite from the first depressed portion with the blank interposed between the first depressed portion and the second depressed portion, when forming a toothed portion on the outer section of the blank by contacting a tooth profile forming portion of the forming die with the curved portion of the blank, accommodating the first projection of the blank in the first depressed portion, and applying a load in the axial direction to a radially center section of the blank such that a constituent material of the blank flows radially outward, the constituent material of the blank at the first projection portion flows in the axial direction to inside the first depressed portion, and the constituent material of the blank at an intermediate section between the center section and the outer section flows in the axial direction to inside the second depressed portion to form a second projection portion, and when the load is at maximum, a space is provided between the toothed portion and the tooth profile forming portion, a space is provided between the first projection portion and the forming die, and a space is provided between the second projection portion and the forming die.

\* \* \* \* \*